(12) United States Patent
Yeon et al.

(10) Patent No.: US 11,794,596 B2
(45) Date of Patent: Oct. 24, 2023

(54) FUEL CELL VEHICLE

(71) Applicants: Hyundai Motor Company, Seoul (KR); Kia Motors Corporation, Seoul (KR)

(72) Inventors: Seung Jun Yeon, Gyeonggi-do (KR); Duck Whan Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 644 days.

(21) Appl. No.: 16/686,366

(22) Filed: Nov. 18, 2019

(65) Prior Publication Data

US 2020/0369165 A1    Nov. 26, 2020

(30) Foreign Application Priority Data

May 20, 2019 (KR) .......................... 10-2019-0059003

(51) Int. Cl.
| | | |
|---|---|---|
| B60L 50/71 | (2019.01) | |
| B60L 50/72 | (2019.01) | |
| H01M 8/2475 | (2016.01) | |
| H01M 8/04858 | (2016.01) | |
| H01M 8/0202 | (2016.01) | |

(52) U.S. Cl.
CPC .............. *B60L 50/71* (2019.02); *B60L 50/72* (2019.02); *H01M 8/0202* (2013.01); *H01M 8/0488* (2013.01); *H01M 8/0494* (2013.01); *H01M 8/2475* (2013.01); *H01M 2250/20* (2013.01)

(58) Field of Classification Search
CPC ...... B60L 50/71; B60L 50/72; H01M 2250/20
See application file for complete search history.

(56) References Cited

U.S. PATENT DOCUMENTS

| | | | | |
|---|---|---|---|---|
| 2003/0108784 A1* | 6/2003 | Enjoji | ..................... | H01M 8/02 429/468 |
| 2009/0183936 A1* | 7/2009 | Kim | .................. | H01M 8/04067 180/68.4 |
| 2014/0110185 A1* | 4/2014 | Naito | ................ | H01M 8/04201 180/65.31 |

FOREIGN PATENT DOCUMENTS

| | | |
|---|---|---|
| JP | 2009190438 A | 8/2009 |
| JP | 2014076716 A | 5/2014 |
| JP | 5788851 B2 | 10/2015 |
| JP | 6114720 B2 | 4/2017 |
| JP | 6153901 B2 | 6/2017 |
| JP | 6344342 B2 | 6/2018 |
| KR | 1020090050117 A * | 5/2009 |

OTHER PUBLICATIONS

Miho et al., JP 2009190438 A; Espacenet machine translation (Year: 2009).*
Yang et al., KR 1020090050117A, Espacenet machine translation, 2009 (Year: 2009).*

* cited by examiner

*Primary Examiner* — Adam A Arciero
(74) *Attorney, Agent, or Firm* — Fox Rothschild LLP

(57) ABSTRACT

A fuel cell vehicle provides improved space utilization and a desired intensity of voltage. The fuel cell vehicle includes a fuel cell, a junction box disposed on the fuel cell, and a power controller disposed between the fuel cell and the passenger compartment. The power controller boosts the output voltage of the fuel cell.

19 Claims, 10 Drawing Sheets

FUEL CELL VEHICLE

CROSS-REFERENCE TO RELATED APPLICATION(S)

This application claims the benefit of Korean Patent Application No. 10-2019-0059003, filed on May 20, 2019, which is hereby incorporated by reference as if fully set forth herein.

BACKGROUND

Field of the Disclosure

The present disclosure relates to a fuel cell vehicle, and more particularly, to a fuel cell vehicle having improved performance.

Discussion of the Related Art

In general, a vehicle including a fuel cell (hereinafter referred to as a "fuel cell vehicle") requires various levels of power from the fuel cell. When a relatively high level of power is required from the fuel cell, the volume of the fuel cell mounted within the vehicle may increase. As a result, the amount of space occupied by the fuel cell in the fuel cell vehicle increases, which may cause various problems.

SUMMARY

Accordingly, exemplary embodiments are directed to a fuel cell vehicle that substantially obviates one or more problems due to limitations and disadvantages of the related art. An object of present disclosure is to provide a fuel cell vehicle having excellent performance.

In one exemplary embodiment, a fuel cell vehicle includes a fuel cell, a junction box disposed on the fuel cell, and a power controller disposed between the fuel cell and the passenger compartment and configured to boost the output voltage of the fuel cell. For example, an accommodation space, in which the fuel cell is mounted, the junction box, and the power controller, may be disposed in at least one of a region in front of the passenger compartment or a region behind the passenger compartment.

The fuel cell vehicle may further include side members disposed on both sides of the fuel cell in a width direction of the vehicle, and a system frame at least partially mounted to the side members, the system frame supporting at least a portion of the fuel cell and the power controller. Additionally, the fuel cell vehicle may further include a driving unit configured to drive the vehicle, and the system frame may be disposed on the driving unit in a height direction.

The fuel cell may have a first width in the width direction, the junction box may have a second width in the width direction, and the power controller may have a third width in the width direction. The first width may be greater than the second width and the second width may be greater than the third width. The fuel cell vehicle may further include a brake booster disposed in a space between the fuel cell and the passenger compartment, and the fuel cell may be spaced apart from the brake booster by a first distance in a longitudinal direction of the vehicle.

Particularly, the first distance may be greater than a first length by which the side members are deformed in the longitudinal direction when the vehicle is involved in a collision. For example, the fuel cell may be disposed to be spaced apart from the brake booster in the longitudinal direction, with an impact-absorbing space interposed therebetween. One of the opposite side surfaces of the power controller may be spaced apart from the impact-absorbing space in the width direction.

Further, the junction box may include a case in which a fuse and a relay are mounted, and a cover detachably disposed on the case, the cover being spaced apart from a hood of the vehicle in the height direction of the vehicle. The power controller may be disposed closer to the passenger compartment than the junction box. For example, the power controller and the junction box may be provided separately, and the fuel cell and the junction box may be coupled to each other independently of the power controller.

The power controller may be detachably coupled to the fuel cell and the system frame. In particular, the power controller may include a front surface facing the fuel cell, a back surface facing the passenger compartment, the back surface being located opposite the front surface, a bottom surface located between the front surface and the back surface, the bottom surface facing the system frame, and a top surface located opposite the bottom surface. The junction box may include a back surface facing the passenger compartment and a front surface located opposite the back surface.

The front surface of the power controller may be coupled to the fuel cell, and the bottom surface of the power controller may be coupled to the system frame. For example, the front surface of the power controller may be located closer to the passenger compartment than the back surface of the junction box. One of the opposite side surfaces of the power controller may be spaced apart from the brake booster in the width direction of the vehicle. The top surface of the power controller may be disposed below the top surface of the junction box.

In addition, the fuel cell vehicle may include a cowl panel, and the top surface of the power controller may be disposed below the cowl panel. For example, the back surface of the power controller may be spaced apart from a dash panel of the vehicle by a second distance in the longitudinal direction. The second distance may be greater than a first length by which the side members are deformed in the longitudinal direction when the vehicle is involved in a collision. The fuel cell may also include current-collecting terminals disposed on the opposite end portions of the fuel cell in the width direction of the vehicle, and terminal blocks that protrude in the height direction of the vehicle, the terminal blocks electrically connecting the current-collecting terminals and the junction box to each other.

Each of the terminal blocks may include a body formed of an insulating material, a first bus bar at least partially embedded in the body, the first bus bar including a first end portion protruding from one side of the body and a second end portion protruding from the opposite side of the body, a first connecting part electrically connecting a corresponding one of the current-collecting terminals to the first end portion, and a second connecting part electrically connecting the junction box to the second end portion.

The junction box may include a third connecting part that protrudes from the back surface in the longitudinal direction, and the power controller may include a fourth connecting part that protrudes from the top surface in the height direction of the vehicle to be connected to the third connecting part. The fourth connecting part may be disposed closer to the front surface of the power controller than to the back surface of the power controller.

Additionally, the fourth connecting part may be spaced apart from the cowl panel by a third distance in the longitudinal direction, and the third distance may be greater than a first length by which the side members are deformed in the longitudinal direction when the vehicle is involved in a collision. The third connecting part and the fourth connecting part may be electrically connected to each other via a second bus bar. The first bus bar and the second bus bar may be electrically conductive.

BRIEF DESCRIPTION OF THE DRAWINGS

Arrangements and exemplary embodiments may be described in detail with reference to the following drawings in which like reference numerals refer to like elements and wherein.

DETAILED DESCRIPTION

The present disclosure will now be described more fully hereinafter with reference to the accompanying drawings, in which various exemplary embodiments are shown. The examples, however, may be embodied in many different forms and should not be construed as being limited to the exemplary embodiments set forth herein. Rather, within the spirit and scope of the present disclosure, one or more components may be selectively and operatively combined or substituted.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms used herein (including technical and scientific terms) have the same meanings as commonly understood by those skilled in the art. It will be further understood that terms, such as those defined in commonly used dictionaries, should be interpreted as having meanings consistent with their meanings in the context of the relevant art.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Terms used in the specification are provided for description of the exemplary embodiments, and the present disclosure is not limited thereto. In the specification, singulars in sentences include plural forms unless otherwise noted. The term "at least one" (or "one or more") should be understood as including all possible combinations that can be suggested from one or more relevant items. For example, the meaning of "at least one of a first item, a second item, or a third item" may be each one of the first item, the second item, or the third item, and may also be all possible combinations that can be suggested from two or more of the first item, the second item, and the third item.

Additionally, terms such as "first", "second", "A", "B", "(a)", "(b)", etc. may be used herein to describe the components of the embodiments. These terms are only used to distinguish one element from another element, and the essence, order, or sequence of corresponding elements is not limited by these terms. It should be noted that if it is described in the specification that one component is "connected", "coupled", or "joined" to another component, the former may be directly "connected", "coupled", or "joined" to the latter, or may be indirectly "connected", "coupled", or "joined" to the latter via another component.

It will be understood that when an element is referred to as being "on" or "under" another element, it can be directly on/under the element, or one or more intervening elements may also be present. When an element is referred to as being "on" or "under," "under the element" as well as "on the element" can be included based on the element.

Hereinafter, fuel cell vehicles 100A, 100B, 100C and 100D according to exemplary embodiments will be described with reference to the accompanying drawings. The fuel cell vehicles 100A, 100B, 100C and 100D will be described using the Cartesian coordinate system (x, y, z) for convenience of description. However, other different coordinate systems may be used. In the drawings, an x-axis, a y-axis, and a z-axis of the Cartesian coordinate system are perpendicular to each other. However, the exemplary embodiment is not limited thereto. In other words, the x-axis, the y-axis, and the z-axis may intersect each other.

Figure 1:
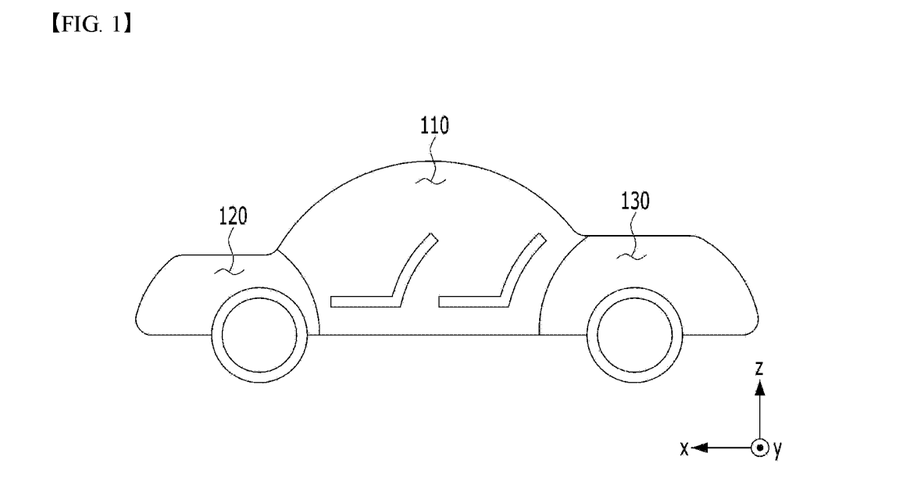
FIG. 1 is a view showing the external appearance of a general vehicle according to an exemplary embodiment of the present disclosure.

FIG. 1 is a view showing the external appearance of a general vehicle. Referring to FIG. 1, a vehicle may include a passenger compartment 110, in which a passenger is seated, a first space 120 disposed in front of the passenger compartment 110, and a second space 130 disposed behind the passenger compartment 110. For example, when the vehicle travels in the x-axis direction, the first space 120 may correspond to an engine compartment in which the engine of the vehicle is accommodated, and the second space 130 may correspond to a trunk.

Figure 2A:
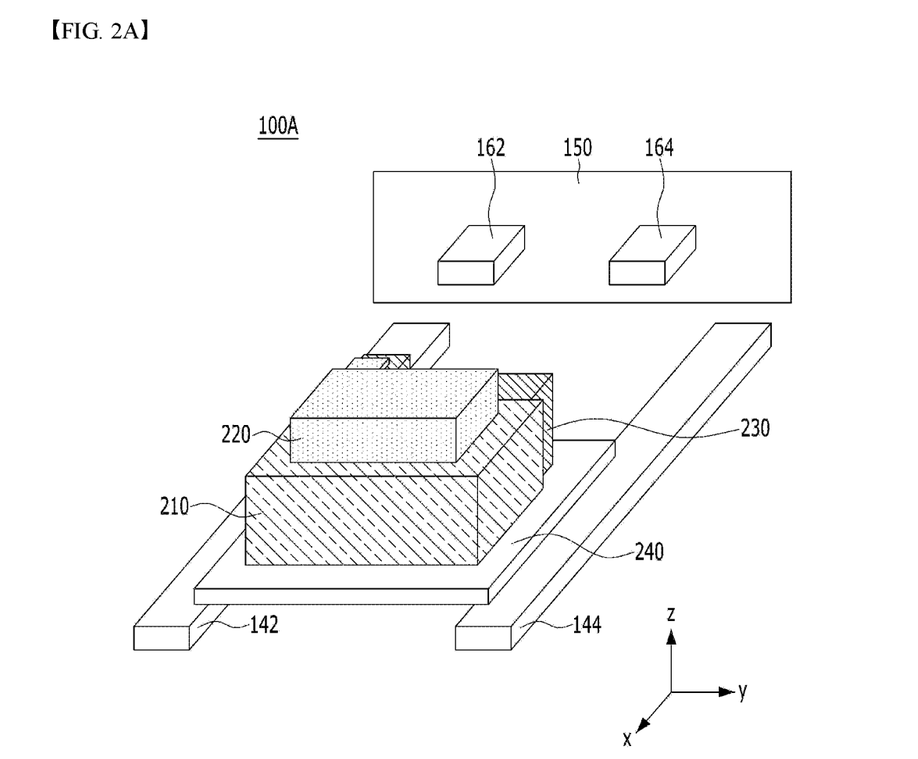
FIGS. 2A to 2D are coupled perspective views of a part of fuel cell vehicles according to an exemplary embodiment of the present disclosure.
Figure 2B:
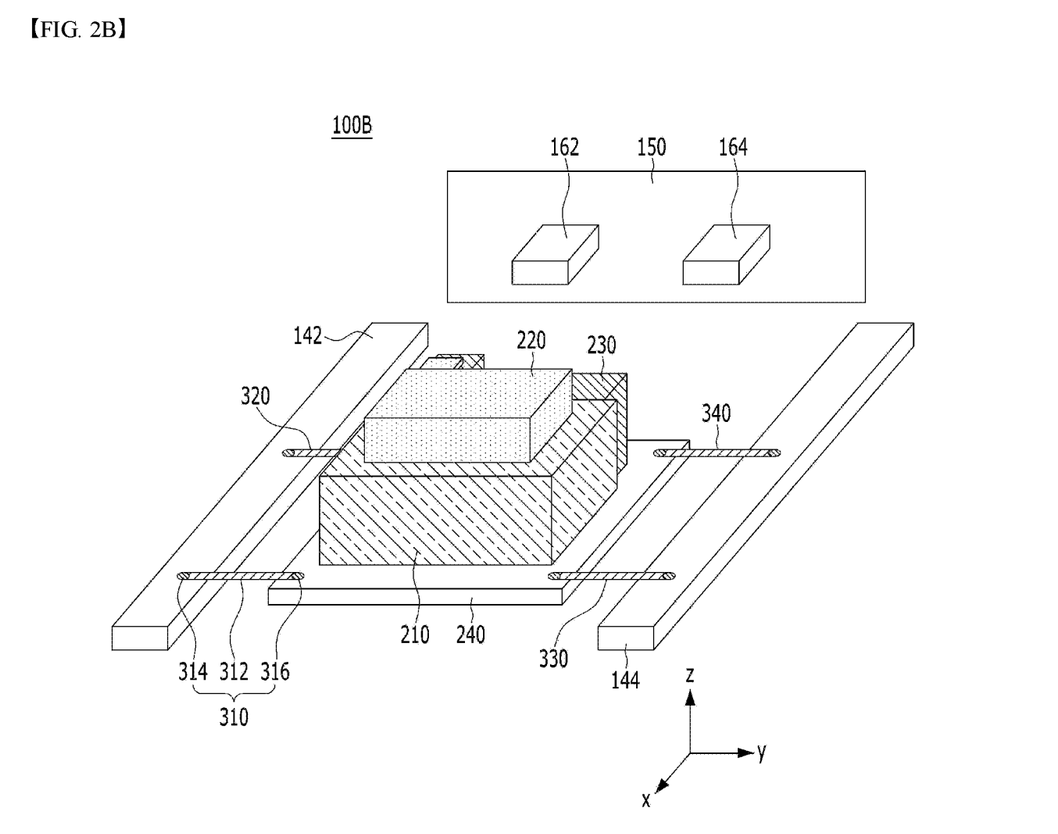
Figure 2C:
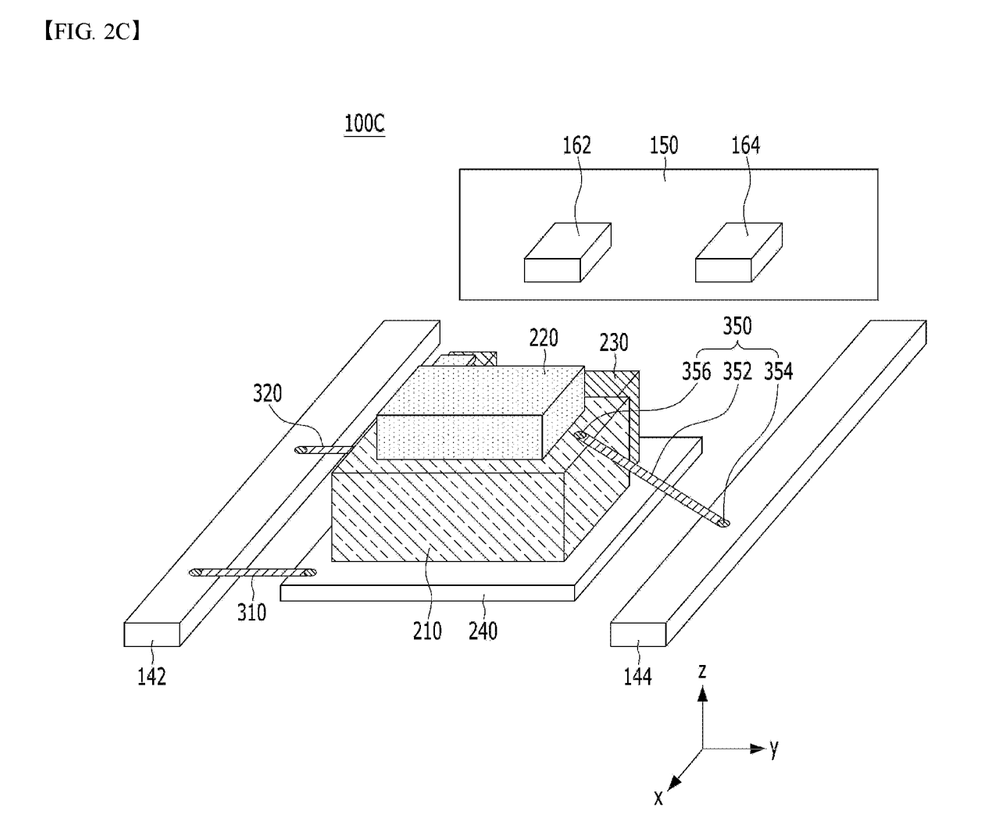
Figure 2D:
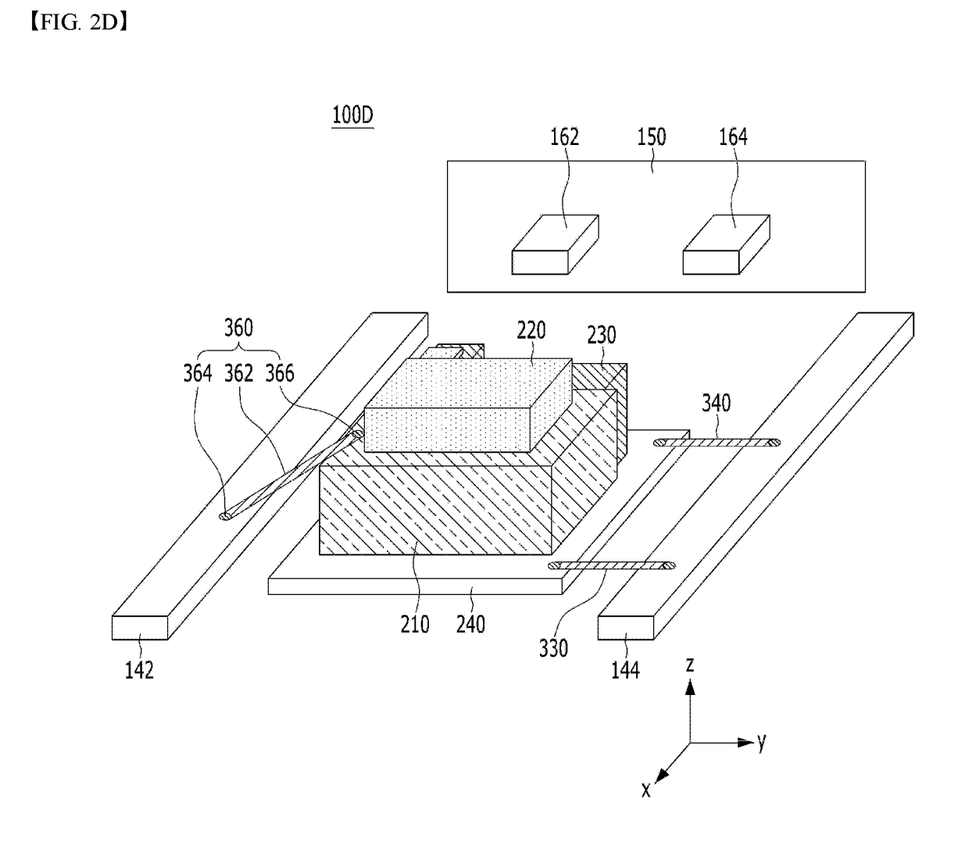
Figure 3:
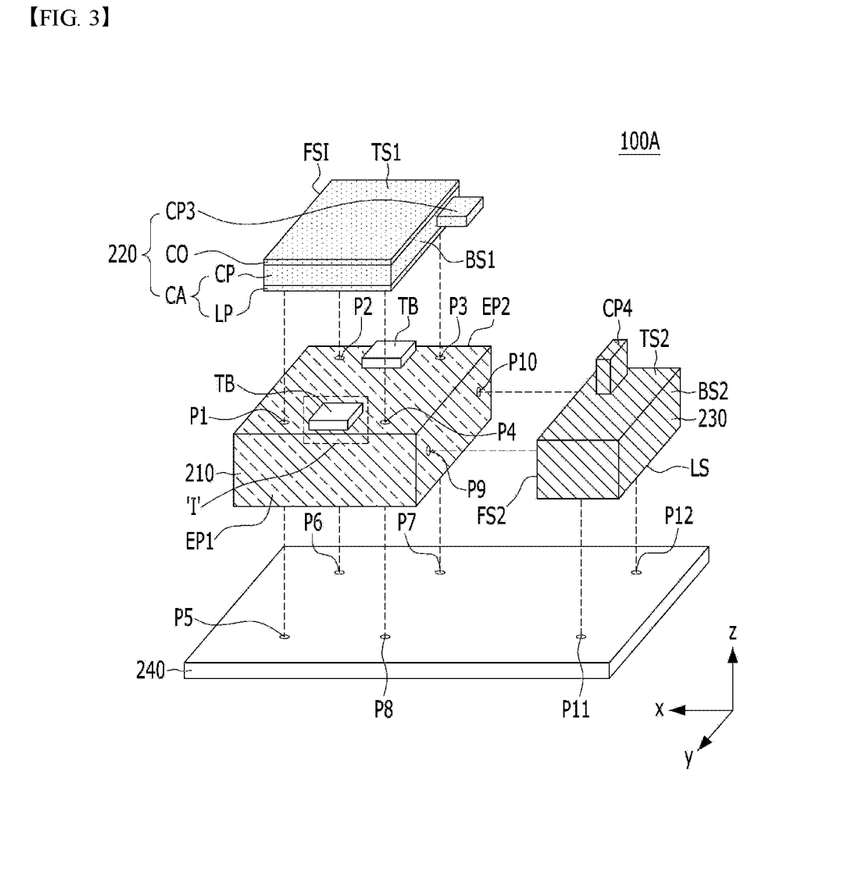
FIG. 3 is a detailed view of the fuel cell vehicle shown in FIG. 2A according to an exemplary embodiment of the present disclosure.
Figure 4:
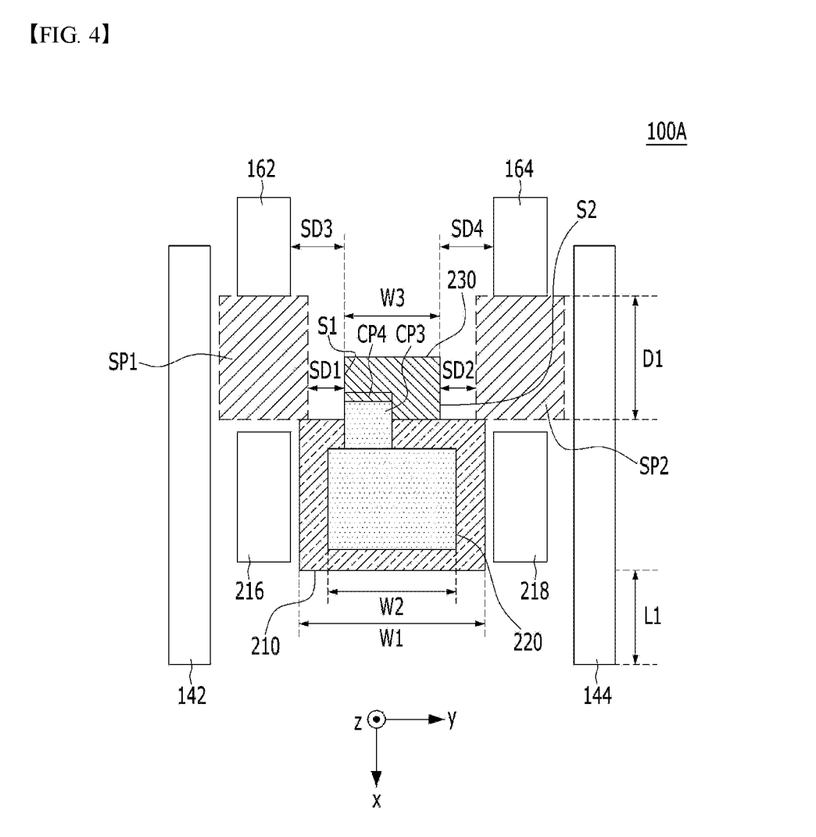
FIG. 4 is a plan view of the fuel cell vehicle shown in FIG. 2A according to an exemplary embodiment of the present disclosure.
Figure 5:
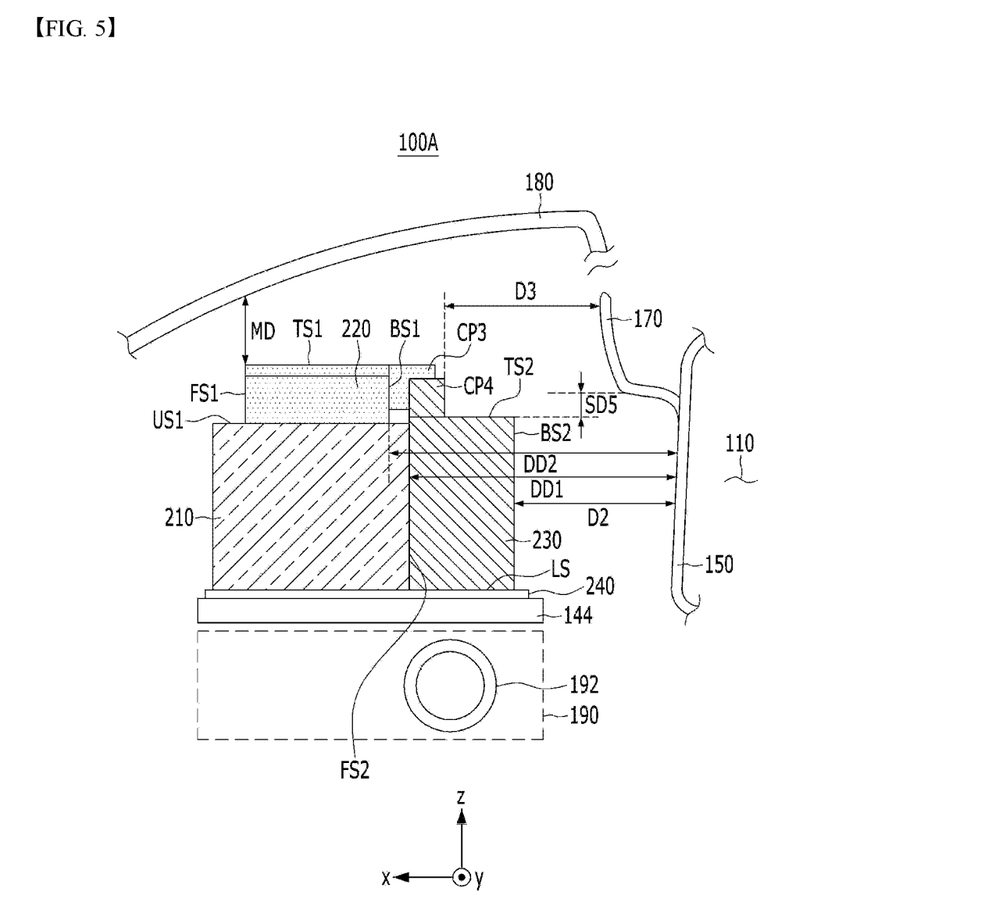
FIG. 5 is a right side sectional view of the fuel cell vehicle shown in FIG. 2A according to an exemplary embodiment of the present disclosure.

FIGS. 2A to 2D are coupled perspective views of a part of fuel cell vehicles 100A, 100B, 100C and 100D according to various exemplary embodiments, FIG. 3 is a detailed view of the fuel cell vehicle 100A shown in FIG. 2A, FIG. 4 is a plan view of the fuel cell vehicle 100A shown in FIG. 2A, and FIG. 5 is a right side sectional view of the fuel cell vehicle 100A shown in FIG. 2A.

In order to help understand the exemplary embodiment and to avoid confusion, illustration of a system frame 240 is omitted from FIG. 4. Hereinafter, the fuel cell vehicle 100A shown in FIG. 2A will be described below. The following description may also be applied to the fuel cell vehicles 100B, 100C and 100D shown in FIGS. 2B to 2D unless otherwise specified.

Referring to FIGS. 2A to 5, the fuel cell vehicle 100A, 100B, 100C or 100D according to an exemplary embodiment may include a fuel cell 210, a junction box (or a high-voltage junction box) 220, and a power controller 230. Hereinafter, the fuel cell 210, the junction box 220, and the power controller 230 are collectively referred to as a "fuel cell system".

The fuel cell 210 included in the fuel cell vehicle 100A, 100B, 100C or 100D according to an exemplary embodiment may include a unit fuel cell, which is not stacked in the vertical direction (e.g. the z-axis direction) or the horizontal direction (e.g. the x-axis direction or the y-axis direction).

Alternatively, the fuel cell 210 included in the fuel cell vehicle 100A, 100B, 100C or 100D according to another exemplary embodiment may include a plurality of unit fuel cells, which are stacked in at least one of the vertical direction or the horizontal direction. For example, the fuel cell 210 may include a plurality of unit fuel cells, which are stacked in at least one of the x-axis direction, the y-axis direction, or the z-axis direction.

Hereinafter, each of the fuel cell vehicles 100A, 100B, 100C and 100D according to the exemplary embodiments shown in FIGS. 2A to 7 will be described as including a single unit fuel cell. However, even when each of the fuel cell vehicles 100A, 100B, 100C and 100D according to the exemplary embodiments includes a plurality of unit fuel cells, the following description may also be applied thereto.

The unit fuel cell may be a polymer electrolyte membrane fuel cell (or a proton exchange membrane fuel cell) (PEMFC), which has been studied extensively as a power source for driving a vehicle. However, the exemplary embodiment is not limited as to the specific configuration or appearance of the unit fuel cell. The unit fuel cell included in the fuel cell 210 may include end plates (e.g., pressing plates or compression plates) (not shown), current collectors (not shown), and a cell stack (not shown).

The cell stack may include a plurality of unit cells, which are stacked in a width direction (hereinafter referred to as a "first direction") (e.g. the y-axis direction). The cell stack may be formed by stacking several tens to several hundreds of unit cells, e.g. 100 to 400 unit cells. Each unit cell may generate about 0.6 volts to 1.0 volts of electricity and on average about 0.7 volts of electricity. Thus, the number of unit fuel cells included in the fuel cell 210 and the number of unit cells included in the cell stack of the unit fuel cell may be determined based on the intensity of the power to be supplied from the fuel cell 210 to a load. Here, "load" may refer to a part of the fuel cell vehicle 100A, 100B, 100C or 100D that requires power.

The end plates may be disposed at respective ends of the cell stack, and may support and fix the unit cells. In other words, the first end plate EP1 may be disposed at a first end of the cell stack, and the second end plate EP2 may be disposed at a second end of the cell stack, opposite to the first end. In addition, the fuel cell 210 may further include a clamping member. For example, in each unit fuel cell, the clamping member may clamp the unit cells in the first direction (e.g. the y-axis direction) together with the end plates.

The junction box 220 may be disposed on the fuel cell 210. The junction box 220 may distribute the power generated in the cell stack of the fuel cell 210. For example, the junction box 220 may include a fuse (not shown) and a relay (not shown) to control peripheral auxiliary components (balance-of-plant (BOP)) assisting in the operation of the fuel cell 210.

Referring to FIG. 3, the junction box 220 may include a case CA and a cover CO. The fuse and the relay may be accommodated in the case CA. Accordingly, the case CA may include a body CP and a lower plate LP. The lower plate LP corresponds to the bottom surface of the case CA, and the body CP forms a space, in which the fuse and the relay are accommodated, together with the lower plate LP. According to the exemplary embodiment, the body CP and the lower plate LP may be formed integrally with each other. The cover CO may be detachably disposed on the case CA.

The power controller 230 may be disposed between the fuel cell 210 and the passenger compartment 110, and may be configured to boost the output voltage of the fuel cell 210. For example, the power controller 230 may include a high-voltage boost direct current-direct current (DC-DC) converter (or a fuel cell DC-DC converter (FDC)). According to the exemplary embodiment, the accommodation space in which the fuel cell 210, the junction box 220 and the power controller 230 are accommodated may be at least one of the first space 120 or the second space 130 shown in FIG. 1.

In the following description, it is assumed that the accommodation space is the first space 120, namely the engine compartment, which is disposed in front of the passenger compartment 110. However, the exemplary embodiment is not limited thereto. The accommodation space may be the second space 130, or may correspond to both the first space 120 and the second space 130.

The fuel cell vehicle 100A, 100B, 100C or 100D according to the exemplary embodiment may further include side members 142 and 144, a brake booster 162 or 164, a cowl panel 170, a hood 180, and a driving unit 190. The side members 142 and 144 may be disposed on both sides of the fuel cell 210 in the first direction. In particular, the side members 142 and 144 may correspond to the vehicle body. In other words, the side members 142 and 144 may correspond to the vehicle body that forms the side portions of the engine compartment of the vehicle.

The brake booster 162 or 164 may be connected to a brake pedal disposed below the driver's seat in the passenger compartment 110 to increase the operation force of the brake pedal when the brake pedal is pressed or engaged. Although it is illustrated in FIGS. 2A, 2B, 2C, 2D and 4 that two brake boosters 162 and 164 are provided, this is merely for the sake of clarity. For example, the fuel cell vehicle 100A, 100B, 100C or 100D may include only the right brake booster 164 when the driver's seat is on the right-hand side of the vehicle, and may include only the left brake booster 162 when the driver's seat is on the left-hand side of the vehicle.

In the fuel cell vehicle 100A, 100B, 100C or 100D according to the exemplary embodiment, the brake booster 162 or 164 may be disposed between the passenger compartment 110 and the accommodation space in which the fuel cell 210, the junction box 220, and the power controller 230 are accommodated. The brake booster 162 or 164 may be configured to be electrically driven. For example, the brake booster 162 or 164 may be disposed in the space between the fuel cell 210 and the passenger compartment 110.

The cowl panel 170 may reduce the risk of injury to a pedestrian during a collision with the front side of the vehicle 100. For example, the upper end of the cowl panel 170, supporting the windshield of the vehicle 100, may be connected to the lower end of the hood 180. However, the exemplary embodiment is not limited as to the specific position of the cowl panel 170. The driving unit 190 may be configured to drive the fuel cell vehicle 100A, 100B, 100C or 100D. Accordingly, the driving unit 190 may include a driving motor 192 or a speed reducer (not shown).

In addition, the fuel cell vehicle 100A, 100B, 100C or 100D may further include a system frame 240. Particularly, the above-described fuel cell system may further include the system frame 240. The system frame 240 may be mounted to (supported by or connected to) at least one of the side members 142 and 144, and may support at least a part of each of the fuel cell 210 and the power controller 230. The fuel cell 210 may be disposed on the system frame 240.

According to an exemplary embodiment, as shown in FIGS. 2A and 2B, the system frame 240 may be disposed on the side members 142 and 144. In particular, as shown in FIG. 2A, the system frame 240 may be directly mounted to the side members 142 and 144. Alternatively, as shown in FIG. 2B, the system frame 240 may be indirectly mounted to the side members 142 and 144 via a connecting member. For example, the connecting member may be a mount support bracket.

As shown in FIG. 2B, the fuel cell vehicle 100B may include first to fourth connecting members 310, 320, 330 and 340. For example, the first connecting member 310 may include a connecting body 312, a bush 314, and a bolt 316. The bush 314 may interconnect the connecting body 312 and the first side member 142, and the bolt 316 may interconnect the connecting body 312 and the system frame 240. Like the first connecting member 310, each of the second to fourth connecting members 320, 330 and 340 may include a connecting body, a bush, and a bolt.

According to another exemplary embodiment, as shown in FIG. 2C or 2D, the system frame 240 may be directly or indirectly mounted to a first one of the side members 142 and 144, and one of the side end portions of the fuel cell 210 may be directly or indirectly mounted to a second one of the side members 142 and 144. For example, as shown in FIG. 2C, the system frame 240 may be indirectly mounted to a first side member 142 of the side members 142 and 144, and one of the side end portions of the fuel cell 210 (e.g., a first side end portion of the fuel cell) may be indirectly mounted to a second side member 144 of the side members 142 and 144.

In other words, the system frame 240 may be indirectly mounted to the first side member 142 via the first and second connecting members 310 and 320, and the fuel cell 210 may be indirectly mounted to the second side member 144 via a fifth connecting member 350. Similar to the first connecting member 310 shown in FIG. 2B, the fifth connecting member 350 may include a connecting body 352, a bush 354, and a bolt 356. Particularly, the connecting body 352, the bush 354, and the bolt 356 perform the same functions as the connecting body 312, the bush 314, and the bolt 316 shown in FIG. 2B, respectively, and thus a duplicate explanation thereof is omitted.

Alternatively, as shown in FIG. 2D, the system frame 240 may be indirectly mounted to the second side member 144, and the opposite one of the side end portions of the fuel cell 210 (e.g., a second side end portion of the fuel cell) may be indirectly mounted to the first side member 142. Specifically, the system frame 240 may be indirectly mounted to the second side member 144 via the third and fourth connecting members 330 and 340, and the fuel cell 210 may be indirectly mounted to the first side member 142 via a sixth connecting member 360.

Similar to the first connecting member 310 shown in FIG. 2B, the sixth connecting member 360 may include a connecting body 362, a bush 364, and a bolt 366. In particular, the connecting body 362, the bush 364, and the bolt 366 perform the same functions as the connecting body 312, the bush 314, and the bolt 316 shown in FIG. 2B, respectively, and thus a duplicate explanation thereof is omitted. Each of the fuel cell vehicles 100B, 100C and 100D shown in FIGS. 2B to 2D may have the same construction as the fuel cell vehicle 100A shown in FIG. 2A, except for the difference in configuration in which the system frame 240 and the fuel cell 210 are mounted to the side members 142 and 144, as described above.

As shown in FIG. 3, the system frame 240 may be formed in the shape of a flat plate that does not include a hollow portion (not shown). However, the exemplary embodiment is not limited thereto. According to another exemplary embodiment, unlike the configuration shown in FIG. 3, the system frame 240 may include a plurality of hollow portions formed therein. The junction box 220 described above may be seated on the fuel cell 210 and may be supported thereby. For example, as shown in FIG. 3, the junction box 220 may be screwed or otherwise fastened to four corners P1 to P4 of the upper surface US1 of the fuel cell 210.

Further, as shown in FIGS. 2A to 2D, 3, and 5, the fuel cell 210 and the power controller 230 may be mounted to the system frame 240 and may be supported thereby. For example, the fuel cell 210 may be screwed or otherwise fastened to four points P5 to P8 of the upper side of the system frame 240. The system frame 240 may be disposed on the driving unit 190 in a height direction (hereinafter referred to as a "second direction") (e.g. the z-axis direction). However, the exemplary embodiment is not limited thereto.

Referring to FIG. 4, the fuel cell 210 may have a first width W1 in the first direction (e.g. the y-axis direction), the junction box 220 may have a second width W2 in the first direction, and the power controller 230 may have a third width W3 in the first direction. According to the exemplary embodiment, the first width W1 may be greater than the second width W2, and the second width W2 may be greater than the third width W3. Further, the fuel cell 210 may be spaced apart from the brake booster 162 or 164 by a first distance D1 in the longitudinal direction of the vehicle (hereinafter referred to as a "third direction") (e.g. the x-axis direction).

In general, the impact force applied to the vehicle in the event of a collision may be transferred to the brake booster. Thereafter, the impact force transferred to the brake booster may push the dash panel 150 into the passenger compartment 110, with the result that the driver's lower body collides with the pedal arm or the brake pedal and thus may be injured. Therefore, the first distance D1 may be set to be greater than a first length L1 by which the side members 142 and 144 are deformed in the third direction (e.g. the x-axis direction) in the event of a collision of the fuel cell vehicle 100A. Since the first distance D1 may be greater than the first length L1, in the event of a collision of the vehicle 100A, the brake booster 162 or 164 may be protected from the collision contact, thereby securing improved safety (e.g., crashworthiness) of the vehicle. Further, the crashworthiness of the vehicle 100A may be secured regardless of whether the driver's seat is on the right-hand side of the vehicle or on the left-hand side of the vehicle.

Furthermore, referring to FIG. 4, the fuel cell 210 may be disposed to be spaced apart from the brake booster 162 or 164, with an impact-absorbing space SP1 or SP2 interposed therebetween, in the third direction (e.g. the x-axis direction). Thus, one of the opposite side surfaces S1 and S2 of the power controller 230 may be spaced apart from the brake booster 162 by a predetermined distance SD3 in the first direction (e.g. the y-axis direction).

Accordingly, one of the opposite side surfaces S1 and S2 of the power controller 230 (e.g., a first opposite side surface) may be spaced apart from the impact-absorbing space SP1 in the first direction (e.g. the y-axis direction). Alternatively, the other one of the opposite side surfaces S1 and S2 of the power controller 230 (e.g., a second opposite side surface) may be spaced apart from the brake booster 164 by a predetermined distance SD4 in the first direction (e.g. the y-axis direction). Accordingly, the other one of the opposite side surfaces S1 and S2 of the power controller 230 may be spaced apart from the impact-absorbing space SP2 in the first direction (e.g. the y-axis direction).

The impact-absorbing space SP1 or SP2 in the fuel cell vehicle 100A may be provided since the third width W3 is less than the first width W1. Since the impact-absorbing space SP1 or SP2 is present, in the event of a collision of the vehicle 100A, the brake booster 162 or 164 may be protected from the collision contact, thereby securing improved rigidity (e.g., crashworthiness) of the vehicle.

Hereinafter, to explain the arrangement of the fuel cell 210, the junction box 220, and the power controller 230, the respective surfaces of the junction box 220 and the power controller 230 are defined as follows. The junction box 220 may include a first back surface BS1, a first front surface FS1, and a first top surface TS1. The first back surface BS1 corresponds to the back surface of the junction box 220, which faces the passenger compartment 110, and the first front surface FS1 corresponds to the front surface of the junction box 220, which is opposite the first back surface BS1.

The power controller 230 may include a second front surface FS2, a second back surface BS2, a bottom surface LS, and a second top surface TS2. The second front surface FS2 corresponds to the front surface of the power controller 230, which faces the fuel cell 210, and the second back surface BS2 corresponds to the back surface of the power controller 230, which faces the passenger compartment 110. The second back surface BS2 corresponds to the surface that is opposite the second front surface FS2. The bottom surface LS may be the surface that is disposed between the second front surface FS2 and the second back surface BS2 and faces the system frame 240. The second top surface TS2 corresponds to the surface that is opposite the bottom surface LS.

According to the exemplary embodiment, as shown in FIG. 5, the cover CO of the junction box 220 may be disposed to be spaced apart from the hood 180 of the vehicle in the second direction. For example, as the minimum distance MD between the hood 180 and the cover CO in the second direction decreases, a larger magnitude of impact may be applied to a pedestrian during a collision with the vehicle 100. When the minimum distance MD is sufficiently secured, it may be possible to protect a pedestrian from the collision with the vehicle 100.

Further, when the hood 180 of the vehicle 100A is opened to perform maintenance of the fuse and the relay in the junction box 220, since the junction box 220 is located at the uppermost position in the accommodation space, it may be possible to more easily perform the maintenance of the vehicle merely by detaching only the cover CO and replacing the fuse and the relay in the junction box 220.

Furthermore, the power controller 230 may be disposed closer to the passenger compartment 110 than the junction box 220. For example, the second front surface FS2 of the power controller 230 may be located closer to the passenger compartment 110 than the first back surface BS1 of the junction box 220. In other words, referring to FIG. 5, a first distance DD1 from the second front surface FS2 of the power controller 230 to the dash panel 150 may be less than a second distance DD2 from the first back surface BS1 of the junction box 220 to the dash panel 150.

Additionally, the power controller 230 may be coupled to at least one of the fuel cell 210 or the system frame 240. For example, referring to FIG. 3, the second front surface FS2 of the power controller 230 may be coupled to the fuel cell 210, and the bottom surface LS of the power controller 230 may be coupled to the system frame 240. For example, the second front surface FS2 of the power controller 230 may be screwed or otherwise fastened to two points P9 and P10 on the back surface of the fuel cell 210, and the bottom surface LS of the power controller 230 may be screwed or otherwise fastened to two points P11 and P12 at the corners of the system frame 240.

Accordingly, the power controller 230 may be coupled to the system frame 240 as well as the fuel cell 210, whereby the power controller 230 may be supported more stably. The power controller 230 may be detachably coupled to the fuel cell 210 and the system frame 240. Thus, in accordance with the voltage specification of the fuel cell vehicle 100A, the power controller 230 may be detached and removed, or may be mounted to at least one of the fuel cell 210 or the system frame 240, as shown in the drawings. Therefore, the fuel cell system according to the exemplary embodiment may be applied to various types of vehicles.

The power controller 230 and the junction box 220 may be provided separately, rather than being integrally formed. The fuel cell 210 and the junction box 220 may be coupled to each other independently of the power controller 230. Thus, even when the power controller 230 is separated from the fuel cell 210 and the system frame 240, the junction box 220 may be secured to the fuel cell 210. In other words, the junction box 220 may be stably secured to the fuel cell 210 regardless of the mounting or removal of the power controller 230.

Moreover, the second top surface TS2 of the power controller 230 may be disposed below the first top surface TS1 of the junction box 220. Accordingly, when the second top surface TS2 is disposed below the first top surface TS1, it may be possible to protect a pedestrian from the collision with the vehicle 100. The second top surface TS2 of the power controller 230 may be disposed below the cowl panel 170. In other words, as shown in FIG. 5, the second top surface TS2 of the power controller 230 may be disposed below the bottom surface of the cowl panel 170 by a predetermined distance SD5. Accordingly, when the second top surface TS2 is located below the bottom surface of the cowl panel 170 by the predetermined distance SD5, it may be possible to prevent deformation of the cowl panel 170 in the event that the vehicle is involved in a collision.

Furthermore, the second back surface BS2 of the power controller 230 may be spaced apart from the dash panel 150 of the vehicle 100 by a second distance D2 in the third direction (e.g. the x-axis direction). In particular, the second distance D2 may be greater than the first length L1 shown in FIG. 4. Accordingly, since the second distance D2 is greater than the first length L1, it may be possible to minimize the risk of injury to the driver due to the deformation of the dash panel 150 during a vehicle collision and to secure high-voltage stability.

Figure 6:
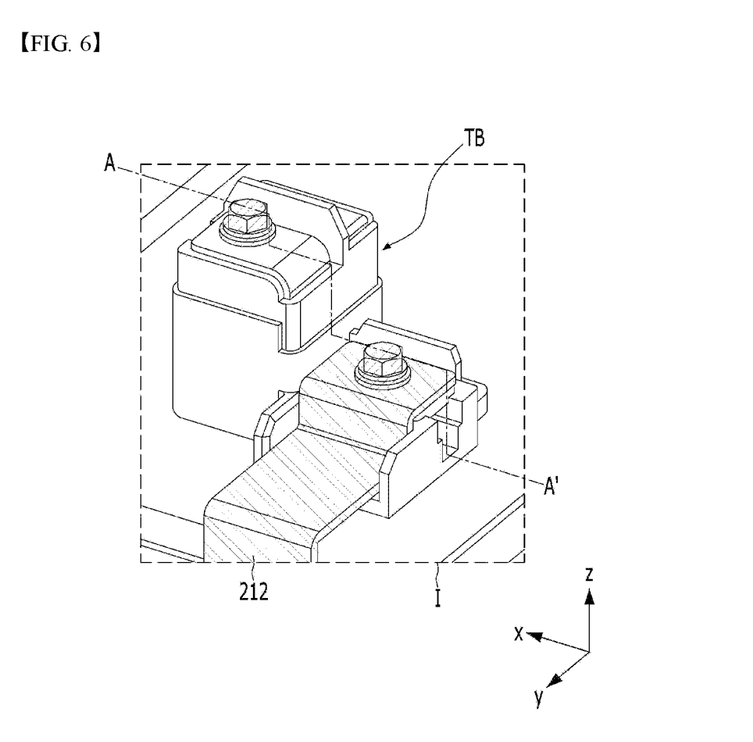
FIG. 6 is an enlarged perspective view of part 'I' shown in FIG. 3 according to an exemplary embodiment of the present disclosure.
Figure 7:
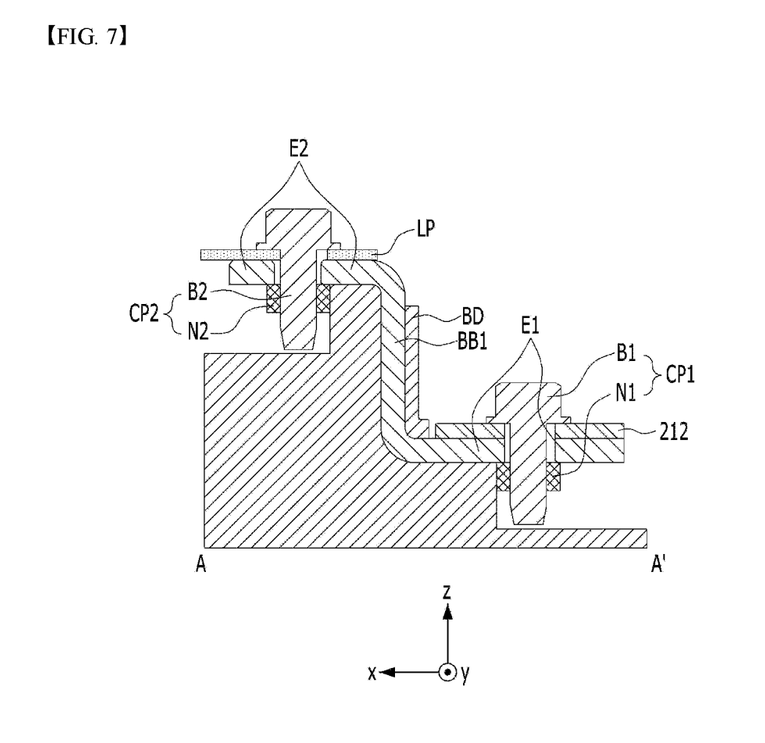
FIG. 7 is a cross-sectional view taken along line A-A' shown in FIG. 6 according to an exemplary embodiment of the present disclosure.

FIG. 6 is an enlarged perspective view of part 'I' shown in FIG. 3, and FIG. 7 is a cross-sectional view taken along line A-A' shown in FIG. 6. Referring to FIGS. 6 and 7, the fuel cell 210 may include current-collecting terminals 212 and terminal blocks TB.

The current-collecting terminals 212 may be disposed on the opposite end portions of the fuel cell 210 in the first direction (e.g. the y-axis direction). In the fuel cell 210, the current collectors may be disposed between the cell stack and the inner surfaces of the first and second end plates EP1 and EP2 of the fuel cell 210 that face the cell stack. The current collectors may collect electrical energy generated due to the flow of electrons in the cell stack and to supply the collected electrical energy to a load of the vehicle 100 in which the fuel cell 210 is used. The current-collecting terminals 212 may be electrically connected to the current collectors.

The terminal blocks TB may protrude from the upper surface US1 of the fuel cell 210 in the second direction, and may electrically connect the current-collecting terminals 212 and the junction box 220. Accordingly, each of the terminal blocks TB may include a body BD, a first bus bar BB1, a first connecting part CP1, and a second connecting part CP2. The body BD may be formed of an insulating material. The first bus bar BB1 may be at least partially embedded in the body BD, and may include first and second end portions E1 and E2. The first end portion E1 may protrude from one side of the body BD (e.g., a first side of the body) toward the first connecting part CP1, and the second end portion E2 may protrude from the opposite side of the body BD (e.g., a second side of the body opposite to the first) toward the second connecting part CP2.

The first connecting part CP1 may electrically connect the current-collecting terminal 212 to the first end portion E1 of the first bus bar BB1. Accordingly, the first connecting part CP1 may include a first bolt B1 and a first nut N1. As shown in FIGS. 6 and 7, the first end portion E1 of the first bus bar BB1 may be electrically connected to the current-collecting terminal 212 by fastening the first bolt B1 to the first nut N1. The first bolt B1 may be formed of an electrically conductive material.

The second connecting part CP2 may electrically connect the junction box 220 to the second end portion E2 of the first bus bar BB1. Accordingly, the second connecting part CP2 may include a second bolt B2 and a second nut N2. As shown in FIGS. 6 and 7, the second end portion E2 of the first bus bar BB1 may be electrically connected to the junction box 220 by fastening the second bolt B2 to the second nut N2. Accordingly, the second bolt B2 may be formed of an electrically conductive material. Specifically, as shown in FIG. 7, the lower plate LP of the case CA of the junction box 220 shown in FIG. 3 may be connected to the second end portion E2 of the first bus bar BB1 via the second connecting part CP2. Thereafter, the components of the junction box 220, such as a fuse and a relay, may be mounted into the case CA, and the cover CO may be closed. The lower plate LP may include an aperture (e.g., threaded bore) formed therein to allow the second bolt B2 to be fitted therethrough.

When the fuel cell 210 and the junction box 220 are electrically connected to each other using a cable (not shown) or when the junction box 220 and the power controller 230 are electrically connected to each other using a cable (not shown), the diameter of the cable and the number of strips thereof may increase excessively, thus making it difficult to manufacture a cable including high-current wires and deteriorating the usability (or bendability) of the cable.

However, in the fuel cell vehicle 100A, 100B, 100C or 100D according to the exemplary embodiment, the fuel cell 210 and the junction box 220 may be electrically connected to each other using the terminal block TB instead of a cable, and the junction box 220 and the power controller 230 may be electrically connected to each other using the bus bar instead of a cable. Therefore, a voltage decrease may be minimized, problems associated with manufacture and use of high-current wiring may be solved, and the design of the fuel cell vehicle may be simplified.

In addition, the junction box 220 may further include a third connecting part CP3, which protrudes from the first back surface BS1 in the third direction. Particularly, the power controller 230 may include a fourth connecting part CP4, which protrudes from the second top surface TS2 in the second direction and is connected to the third connecting part CP3. The fourth connecting part CP4 may be disposed closer to the second front surface FS2 of the power controller 230 than to the second back surface BS2 of the power controller 230.

Further, the fourth connecting part CP4 may be spaced apart from the cowl panel 170 by a third distance D3 in the third direction. In particular, the third distance D3 may be the minimum distance between the fourth connecting part CP4 and the cowl panel 170. The third distance D3 may be greater than the first length L1. Accordingly, since the third distance D3 is greater than the first length L1, it may be possible to minimize the risk of injury to the driver due to the deformation of the dash panel 150 in the event of a collision involving the vehicle 100A, 100B, 100C or 100D and to secure high-voltage stability.

Although not illustrated, the third connecting part CP3 and the fourth connecting part CP4 may be electrically connected to each other via a second bus bar (not shown) in the same manner as shown in FIGS. 6 and 7. Each of the first bus bar BB1 and the second bus bar may be formed of an electrically conductive material, such as copper or aluminum. However, the exemplary embodiment is not limited as to the specific material of the first bus bar BB1 and the second bus bar.

Figure 8A:
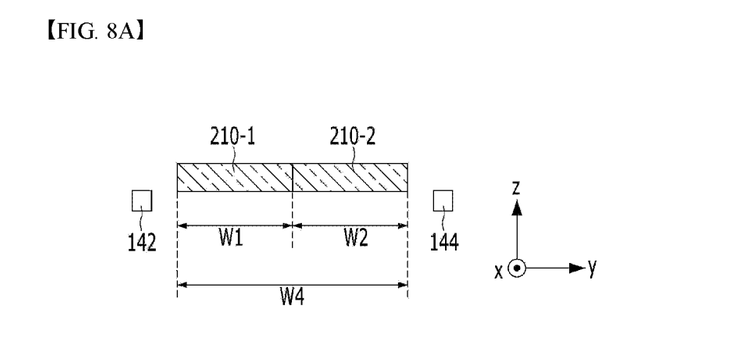
FIGS. 8A and 8B are cross-sectional views of the fuel cell vehicle according to an exemplary embodiment of the present disclosure.
Figure 8B:
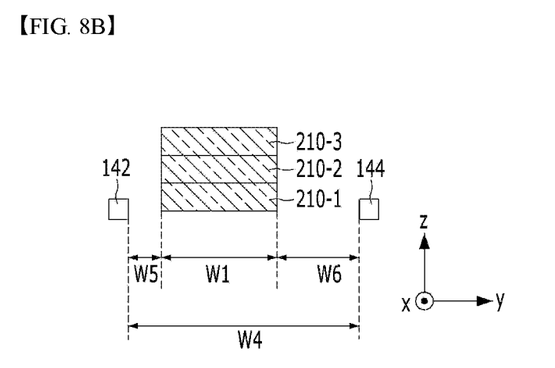

FIGS. 8A and 8B are cross-sectional views of the fuel cell vehicle according to the exemplary embodiment. The fuel cell 210 according to the above-described exemplary embodiment may include, as shown in FIG. 8A, two unit fuel cells 210-1 and 210-2, which are stacked in the first direction (e.g. the y-axis direction), or may include, as shown in FIG. 8B, three unit fuel cells 210-1, 210-2 and 210-3, which are stacked in the second direction (e.g. the z-axis direction).

Since side members 142 and 144 shown in FIGS. 8A and 8B perform the same function as the side members 142 and 144 of the vehicle according to the above-described exemplary embodiment, a duplicate explanation thereof is omitted. Only the fuel cell 210 and the side members 142 and 144 are illustrated in FIGS. 8A and 8B for convenience of description.

When the fuel cell vehicle does not include a power controller (e.g. an FDC), the intensity of voltage (or power) supplied from the fuel cell may be determined based on the number of cell stacks included in the fuel cell. For example, 400 stacked cells may be needed to generate the required intensity of voltage. The number of cells included in each of the unit fuel cells 210-1 and 210-2 shown in FIG. 8A may increase or decrease only in the first direction (e.g. the y-axis direction).

Therefore, when two unit fuel cells 210-1 and 210-2, in each of which 200 cells are stacked, are connected to each other and arranged in the first direction (e.g. the y-axis direction), which is the width direction, the width occupied by the unit fuel cells 210-1 and 210-2 in the first direction (e.g. the y-axis direction) increases, and thus the space between the side members 142 and 144 of the vehicle and the unit fuel cells 210-1 and 210-2 decreases, thus making it difficult to dispose an interface part (not shown) in the space between the unit fuel cells 210-1 and 210-2 and the side members 142 and 144.

Accordingly, when the fuel cell vehicle 100A, 100B, 100C or 100D according to the exemplary embodiment uses the power controller 230, e.g. an FDC, the fuel cell may include only one of two unit fuel cells 210-1 and 210-2, in each of which 400 cells are stacked, or may include two unit fuel cells 210-1 and 210-2, in each of which less than 400 cells are stacked. Therefore, an extra space may be formed between the side member 142 and the fuel cell 210 in the first direction (e.g. the y-axis direction). For example, as shown in FIG. 4, a hydrogen supply system 216 and a heat/water management system 218 may be disposed in such an extra space, thus more effectively utilizing the space than the configuration shown in FIG. 8A, in which each of the two unit fuel cells 210-1 and 210-2 includes 400 stacked cells.

Further, if a fourth width W4 between the side members 142 and 144 in the first direction, shown in FIG. 8A, is too small to stack a desired number of cells, it may be difficult to provide a desired intensity of voltage. Therefore, the fuel cell vehicle 100A, 100B, 100C or 100D according to the exemplary embodiment is configured to boost the voltage output from the fuel cell 210 using the power controller 230, e.g. an FDC, thus providing a desired intensity of voltage even when the fourth width W4 is insufficient.

To more effectively utilize the space than for the vehicle shown in FIG. 8A, the fuel cell vehicle shown in FIG. 8B may be constructed with three unit fuel cells 210-1 to 210-3 stacked in the second direction (e.g. the z-axis direction). In particular, a larger space may be formed between the side members 142 and 144 of the vehicle and the unit fuel cells 210-1 to 210-3 than the space formed in the vehicle shown in FIG. 8A. In other words, a space corresponding to a fifth width W5 may be formed between the side member 142 and the unit fuel cell 210-1, and a space corresponding to a sixth width W6 may be formed between the side member 144 and the unit fuel cell 210-1, thereby more effectively utilizing the space compared to the fuel cell vehicle shown in FIG. 8A.

For the vehicle shown in FIG. 8B, since the unit fuel cells 210-1 to 210-3 having the same configuration are stacked in the second direction (e.g. the z-axis direction), the manufacturing cost thereof may increase. In particular, since each of the unit fuel cells 210-1 to 210-3 includes components such as an end plate, a clamping member, an insulating plate, and an end cell heater, and the respective components need to be provided in a plural number for all of the unit fuel cells 210-1 to 210-3 and therefore, the manufacturing cost increases.

However, since the fuel cell vehicle 100A, 100B, 100C or 100D according to the exemplary embodiment, as described above, uses the FDC, it may be capable of providing a desired intensity of power to a load of the vehicle using only one unit fuel cell 210-1, 210-2 or 210-3 without the necessity to stack the unit fuel cells. Therefore, compared to the vehicle shown in FIG. 8B, in which the unit fuel cells 210-1, 210-2 and 210-3 are stacked, the components of the fuel cell, such as an end plate, a clamping member, an insulating plate, and an end cell heater, do not need to be provided in a plural number, thus reducing manufacturing costs.

Further, as described above, in the fuel cell vehicle 100A, 100B, 100C or 100D according to the exemplary embodiment, through appropriate arrangement of the parts of the fuel cell system, namely the fuel cell 210, the junction box 220, the power controller 230, and the system frame 240, it may be possible to secure excellent crashworthiness of the vehicle, to facilitate maintenance of the vehicle, to prevent deformation of parts (e.g. a cowl panel) of the vehicle, to enable application of the fuel cell system to various types of vehicles, and to protect a driver or a pedestrian.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the exemplary embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell vehicle, comprising:
   a fuel cell;
   a junction box disposed above the fuel cell; and
   a power controller disposed between the fuel cell and a passenger compartment and configured to boost an output voltage of the fuel cell,
   wherein the fuel cell includes:
   current-collecting terminals disposed on opposite end portions of the fuel cell in a width direction of the vehicle; and
   terminal blocks that protrude in a height direction of the vehicle, the terminal blocks electrically connecting the current-collecting terminals and the junction box to each other.

2. The fuel cell vehicle according to claim 1, further comprising:
   an accommodation space in which the fuel cell, the junction box, and the power controller are housed, is disposed in at least one of a region in front of the passenger compartment or a region behind the passenger compartment.

3. The fuel cell vehicle according to claim 2, further comprising:

side members disposed on both sides of the fuel cell in a width direction of the vehicle; and
a system frame at least partially mounted to the side members, the system frame supporting at least a portion of the fuel cell and the power controller.

4. The fuel cell vehicle according to claim 3, wherein the fuel cell has a first width in the width direction, the junction box has a second width in the width direction, the power controller has a third width in the width direction, and the first width is greater than the second width, and the second width is greater than the third width.

5. The fuel cell vehicle according to claim 3, further comprising:
a brake booster disposed in a space between the fuel cell and the passenger compartment,
wherein the fuel cell is spaced apart from the brake booster by a first distance in a longitudinal direction of the vehicle.

6. The fuel cell vehicle according to claim 5, wherein the first distance is greater than a first length by which the side members are deformed in the longitudinal direction during a collision.

7. The fuel cell vehicle according to claim 5, wherein the fuel cell is disposed to be spaced apart from the brake booster in the longitudinal direction, with an impact-absorbing space interposed therebetween.

8. The fuel cell vehicle according to claim 7, wherein one of opposite side surfaces of the power controller is spaced apart from the impact-absorbing space in the width direction.

9. The fuel cell vehicle according to claim 1, wherein the power controller and the junction box are provided separately, and the fuel cell and the junction box are coupled to each other independently of the power controller.

10. The fuel cell vehicle according to claim 3, wherein the power controller is detachably coupled to the fuel cell and the system frame.

11. The fuel cell vehicle according to claim 5, wherein the power controller includes:
a front surface facing the fuel cell;
a back surface facing the passenger compartment, the back surface being disposed opposite the front surface;
a bottom surface disposed between the front surface and the back surface, the bottom surface facing the system frame; and
a top surface disposed opposite the bottom surface, and
wherein the junction box includes:
a back surface facing the passenger compartment; and
a front surface disposed opposite the back surface.

12. The fuel cell vehicle according to claim 11, wherein the front surface of the power controller is coupled to the fuel cell, and the bottom surface of the power controller is coupled to the system frame.

13. The fuel cell vehicle according to claim 11, wherein one of opposite side surfaces of the power controller is spaced apart from the brake booster in the width direction of the vehicle.

14. The fuel cell vehicle according to claim 11, wherein the top surface of the power controller is disposed below the top surface of the junction box.

15. The fuel cell vehicle according to claim 11, further comprising:
a cowl panel,
wherein the top surface of the power controller is disposed below the cowl panel.

16. The fuel cell vehicle according to claim 11, wherein the back surface of the power controller is spaced apart from a dash panel of the vehicle by a second distance in the longitudinal direction, and
wherein the second distance is greater than a first length by which the side members are deformed in the longitudinal direction during a collision.

17. The fuel cell vehicle according to claim 1, wherein each of the terminal blocks includes:
a body formed of an insulating material;
a first bus bar at least partially embedded in the body, the first bus bar including a first end portion that protrudes from a first side of the body and a second end portion that protrudes from a second side of the body;
a first connecting part electrically connecting a corresponding one of the current-collecting terminals to the first end portion; and
a second connecting part electrically connecting the junction box to the second end portion.

18. The fuel cell vehicle according to claim 17, wherein the junction box includes a third connecting part that protrudes from the back surface in the longitudinal direction, and the power controller includes a fourth connecting part that protrudes from the top surface in a height direction of the vehicle to be connected to the third connecting part.

19. The fuel cell vehicle according to claim 1, wherein the power controller is disposed closer to the passenger compartment than the junction box.

* * * * *